United States Patent
Sasaki

(10) Patent No.: US 11,619,741 B2
(45) Date of Patent: Apr. 4, 2023

(54) SURVEYING DATA PROCESSING DEVICE, SURVEYING DATA PROCESSING METHOD, AND SURVEYING DATA PROCESSING PROGRAM

(71) Applicant: Topcon Corporation, Tokyo (JP)

(72) Inventor: You Sasaki, Tokyo (JP)

(73) Assignee: Topcon Corporation, Tokyo (JP)

(*) Notice: Subject to any disclaimer, the term of this patent is extended or adjusted under 35 U.S.C. 154(b) by 327 days.

(21) Appl. No.: 16/994,698

(22) Filed: Aug. 17, 2020

(65) Prior Publication Data
US 2021/0080587 A1 Mar. 18, 2021

(30) Foreign Application Priority Data
Sep. 18, 2019 (JP) .............................. JP2019-169110

(51) Int. Cl.
*G01S 17/89* (2020.01)
*G06T 7/70* (2017.01)
(Continued)

(52) U.S. Cl.
CPC .............. *G01S 17/89* (2013.01); *G01S 17/06* (2013.01); *G06T 7/0002* (2013.01); *G06T 7/70* (2017.01); *G06T 2207/10028* (2013.01)

(58) Field of Classification Search
CPC ....... G01C 15/002; G01S 17/06; G01S 17/89; G01S 7/4808; G06T 2207/10028;
(Continued)

(56) References Cited

U.S. PATENT DOCUMENTS 6,608,913 B1* 8/2003 Hinton .................... G01C 7/06
382/104
7,969,558 B2* 6/2011 Hall ...................... H01S 5/0428
356/141.5
(Continued)

FOREIGN PATENT DOCUMENTS

JP    2008-268004 A    11/2008
JP    2010-151682 A    7/2010
(Continued)

OTHER PUBLICATIONS

Toshiba Review, vol. 73, Issue 6, Nov. 2018, retrieved online from https://www.toshiba.co.jp/tech/review/abstract/2018_06.htm, 9 pgs (including translation).
(Continued)

*Primary Examiner* — Peter D Le
(74) *Attorney, Agent, or Firm* — Chiesa, Shahinian & Giantomasi PC

(57) ABSTRACT

Point cloud data relating to a matching target is efficiently eliminated after completion of a process of matching between sets of point cloud data obtained at different viewpoints. The surveying data processing device includes a target detecting unit, a location acquiring unit, a point cloud data eliminating region setting unit, and a point cloud data eliminating unit. The target detecting unit detects a target in point cloud data. The point cloud data is obtained by emitting laser light on an object having the target and by detecting the light reflected back from the object. The target location acquiring unit acquires a location of the detected target. The point cloud data eliminating region setting unit sets a point cloud data eliminating region containing the target, based on the location of the target. The point cloud data eliminating unit eliminates point cloud data contained in the point cloud data eliminating region.

6 Claims, 2 Drawing Sheets

(51) Int. Cl.
*G01S 17/06* (2006.01)
*G06T 7/00* (2017.01)

(58) Field of Classification Search
CPC ......... G06T 5/005; G06T 5/50; G06T 7/0002; G06T 7/33; G06T 7/70; G06T 1/00; G06T 3/00; G06T 2219/00; G06T 5/00; G06T 7/00; G06T 9/00; G06T 11/00; G06T 13/00; G06T 15/00; G06T 17/00; G06T 19/00; G06T 2200/00; G06T 2201/00; G06T 2207/00; G06T 2210/00; G06T 2211/00; G06T 2213/00; G06T 2215/00
See application file for complete search history.

(56) References Cited

U.S. PATENT DOCUMENTS

| | | | |
|---|---|---|---|
| 8,767,190 B2 | 7/2014 | Hall | |
| 2006/0061566 A1* | 3/2006 | Verma | G06T 17/20 345/582 |
| 2009/0241358 A1* | 10/2009 | Ohtomo | G01C 15/002 33/275 R |
| 2010/0256940 A1* | 10/2010 | Ogawa | G01S 7/497 356/243.8 |
| 2012/0218546 A1 | 8/2012 | Ogawa et al. | |
| 2012/0256916 A1* | 10/2012 | Kitamura | G01S 17/89 345/419 |
| 2013/0051658 A1* | 2/2013 | Hwang | G06V 20/64 382/154 |
| 2013/0176305 A1* | 7/2013 | Ito | G01C 15/002 345/420 |
| 2013/0236107 A1 | 9/2013 | Fukaya et al. | |
| 2014/0298666 A1* | 10/2014 | Zogg | G01B 11/27 33/286 |
| 2014/0341464 A1* | 11/2014 | Fan | G06T 5/008 382/154 |
| 2015/0293224 A1 | 10/2015 | Eldada et al. | |
| 2016/0063717 A1* | 3/2016 | Sasaki | G06T 7/521 345/419 |
| 2016/0148436 A1* | 5/2016 | Chang | G06T 19/20 382/106 |
| 2016/0150217 A1* | 5/2016 | Popov | H04N 13/257 348/47 |
| 2016/0154999 A1* | 6/2016 | Fan | G06V 20/64 382/103 |
| 2016/0306040 A1* | 10/2016 | Hunt | G01S 15/96 |
| 2017/0116781 A1* | 4/2017 | Babahajiani | G06T 15/506 |
| 2017/0154433 A1* | 6/2017 | Takakura | G06T 7/593 |
| 2017/0168142 A1* | 6/2017 | Kumagai | H04N 5/2257 |
| 2017/0236024 A1* | 8/2017 | Wang | G06T 7/73 382/201 |
| 2017/0269197 A1 | 9/2017 | Hall et al. | |
| 2017/0308736 A1* | 10/2017 | Sharma | G06V 10/757 |
| 2017/0350692 A1* | 12/2017 | Ohtomo | H04N 7/183 |
| 2018/0003825 A1* | 1/2018 | Komeichi | G01S 7/4817 |
| 2018/0005018 A1* | 1/2018 | Young | G06V 20/653 |
| 2018/0053305 A1* | 2/2018 | Gu | G06Q 50/28 |
| 2018/0070905 A1* | 3/2018 | El-Baz | G06T 7/149 |
| 2018/0253821 A1* | 9/2018 | Komeichi | G06T 19/20 |
| 2018/0307924 A1* | 10/2018 | Zeng | G06V 10/143 |
| 2018/0364033 A1* | 12/2018 | Döring | G03B 35/08 |
| 2019/0005162 A1* | 1/2019 | Kwon | G06T 17/00 |
| 2019/0086548 A1 | 3/2019 | Nishita et al. | |
| 2019/0139297 A1* | 5/2019 | Chen | G06V 10/75 |
| 2019/0227149 A1* | 7/2019 | Altmann | G01S 17/933 |
| 2019/0258225 A1* | 8/2019 | Link | G05B 19/4097 |
| 2019/0286915 A1* | 9/2019 | Patil | G06V 10/764 |
| 2019/0295179 A1* | 9/2019 | Shalev-Shwartz | G06Q 40/08 |
| 2019/0323843 A1* | 10/2019 | Yu | G06T 7/73 |
| 2019/0383913 A1* | 12/2019 | Crouch | G01S 17/42 |
| 2019/0383941 A1* | 12/2019 | Siddiqui | G01S 17/89 |
| 2020/0082571 A1* | 3/2020 | Xie | G06T 7/85 |
| 2020/0100445 A1* | 4/2020 | Saba | G06F 7/00 |
| 2020/0135035 A1* | 4/2020 | Yuan | G08G 5/0013 |
| 2020/0284686 A1* | 9/2020 | Li | G01M 5/0091 |
| 2020/0390406 A1* | 12/2020 | Xu | A61B 6/547 |
| 2021/0001891 A1* | 1/2021 | Majithia | G01C 21/3833 |
| 2021/0056324 A1* | 2/2021 | Chen | G06N 3/0454 |
| 2022/0139040 A1* | 5/2022 | Liu | G06T 19/00 345/419 |
| 2022/0206114 A1* | 6/2022 | Steinberg | G01S 7/484 |

FOREIGN PATENT DOCUMENTS

| | | |
|---|---|---|
| JP | 2011-053030 A | 3/2011 |
| JP | 2011-053031 A | 3/2011 |
| JP | 2013-178656 A | 9/2013 |
| JP | 2013-186816 A | 9/2013 |

OTHER PUBLICATIONS

"LiDAR's MEMS Formula and Solid State Formula, Features and Explain the Difference," Autonomous Driving Lab, Oct. 12, 2018, retrieved online from https://jidounten-lab.com/y_6506, 12 pgs (including translation).
Extended European Search Report dated Feb. 9, 2021, in connection with European Patent Application No. 20195192.8, 8 pgs.

* cited by examiner

SURVEYING DATA PROCESSING DEVICE, SURVEYING DATA PROCESSING METHOD, AND SURVEYING DATA PROCESSING PROGRAM

CROSS-REFERENCE TO RELATED APPLICATIONS

This application claims priority to Japanese Patent Application No. 2019-169110, filed Sep. 18, 2019, the disclosure of which is incorporated herein by reference in its entirety.

TECHNICAL FIELD

The present invention relates to techniques for processing point cloud data obtained by LiDAR (Light Detection and Ranging, Laser Imaging Detection and Ranging).

BACKGROUND

Techniques for obtaining three-dimensional information are publicly known. In these techniques, laser light is emitted on an object, and the laser light that is reflected back from the object is measured, whereby three-dimensional information of a point of the object reflecting the laser light is obtained. These techniques are called "LiDAR (Light Detection and Ranging, Laser Imaging Detection and Ranging)" (for example, refer to Toshiba Review Vol. 73, No. 6, November, 2018, and "Jidounten LAB.", Oct. 12, 2018, https://jidounten-lab.com/y_6506). Obtaining three-dimensional information of a large number of points yields point cloud data.

Integration of multiple sets of point cloud data that are obtained from different viewpoints involves a matching process for determining a correspondence relationship between sets of point cloud data. This matching process is efficiently performed by, e.g., a method using a matching target.

The matching target is not an object to be measured, and therefore, point cloud data of this target and relevant parts such as a tripod supporting the matching target, is not necessary after the matching process is completed.

SUMMARY

In view of these circumstances, an object of the present invention is to provide a technique for efficiently eliminating point cloud data relating to a matching target after completion of a process of matching between sets of point cloud data obtained at different viewpoints.

The present invention provides a surveying data processing device including a target detecting unit, a target location acquiring unit, a setting unit, and a point cloud data eliminating unit. The target detecting unit detects a target in point cloud data that is obtained from an object having at least one target. The target is identifiable as a target. The target location acquiring unit acquires a location of the detected target. The setting unit sets a specific space containing the target, on the basis of the location of the target. The point cloud data eliminating unit eliminates point cloud data that is contained in the specific space.

According to aspects of the present invention, the point cloud data may be obtained by laser scanning, and whether or not a detected intensity of light that is reflected back from the object is a specific value or greater, may be determined to detect the target. According to aspects of the present invention, the specific space may be a tubular space. According to aspects of the present invention, the specific space may be a cylindrical or a circular columnar space. According to aspects of the present invention, the target may include a reflection prism and a leg part that supports the reflection prism, and the tubular space may be set so as to have dimensions for containing the reflection prism and the leg part.

According to aspects of the present invention, the specific space may be set in such a manner as not to contain point cloud data of a plane crossing a vertical axis that passes the location of the target.

The present invention also provides a surveying data processing method including detecting a target in point cloud data that is obtained from an object having at least one target. The target is identifiable as a target. The method also includes acquiring a location of the detected target, setting a specific space that contains the target, on the basis of the location of the target, and eliminating point cloud data that is contained in the specific space.

The present invention also provides a non-transitory computer recording medium storing computer executable instructions that, when executed by a computer processor, cause the computer processor to detect a target in point cloud data that is obtained from an object having at least one target. The target is identifiable as a target. The computer executable instructions that, when executed by a computer processor, also cause the computer processor to acquire a location of the detected target, set a specific space containing the target, on the basis of the location of the target, and eliminate point cloud data that is contained in the specific space.

Thus, the present invention provides a technique that enables efficiently eliminating point cloud data relating to a matching target after completion of a process of matching between sets of point cloud data obtained at different viewpoints.

DETAILED DESCRIPTION

1. First Embodiment

Configuration of Hardware

Figure 1:
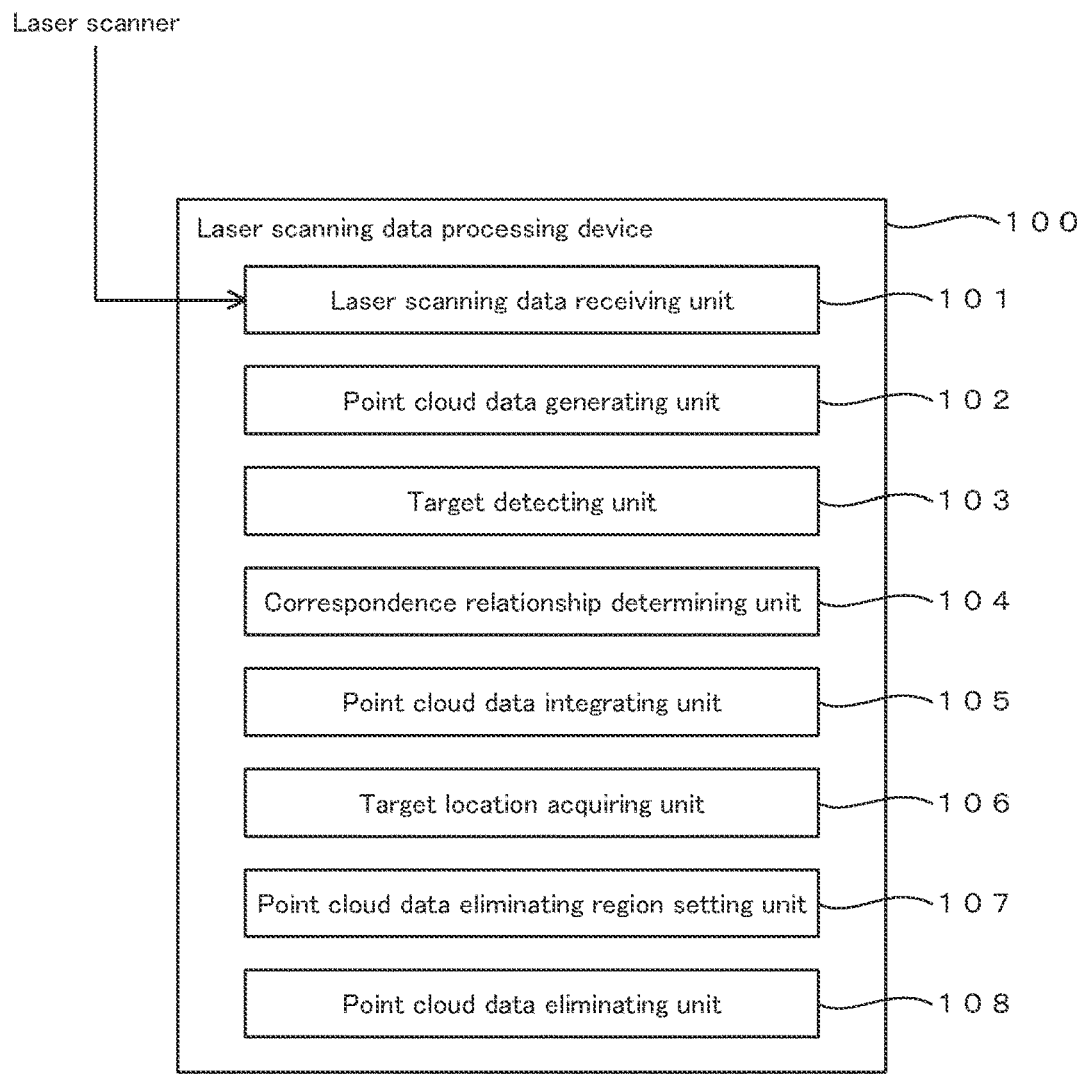
FIG. 1 is a block diagram of an embodiment.

FIG. 1 shows a block diagram of a laser scanning data processing device 100 as an example of a surveying data processing device using the present invention. The laser scanning data processing device 100 is constituted by using a commercially available personal computer (PC).

The laser scanning data processing device 100 functions as a computer. The function of each of the functional units of the laser scanning data processing device 100 is implemented in such a manner that application software for implementing each of the functional units shown in FIG. 1 is installed in a PC to be used and that a program constituting the application software is executed by a CPU of the PC. One or more or all of each of the functional units may be composed of any type of processor or electronic circuit. Alternatively or additionally, at least one of the functional units may be implemented by using an arithmetic operation section of an external personal computer (PC) or of a server.

The laser scanning data processing device 100 includes a laser scanning data receiving unit 101, a point cloud data generating unit 102, a target detecting unit 103, a correspondence relationship determining unit 104, a point cloud data integrating unit 105, a target location acquiring unit 106, a point cloud data eliminating region setting unit 107, and a point cloud data eliminating unit 108. In addition, the laser scanning data processing device 100 also includes a data storage, a communication unit, and a user interface unit, which are typical units provided to an ordinary PC.

The laser scanning data receiving unit 101 receives two or more sets of laser scanning data that are respectively obtained at instrument points different from each other. The laser scanning data contains a direction and a distance of a scanned point as viewed from an optical origin of a laser scanner, which is an instrument point, as well as measured data of an intensity of light reflected back from a reflection point.

In this example, laser scanning is performed on an object to be measured, at multiple instrument points or multiple viewpoints that are different from each other. One or more laser scanners are used. The instrument points and scanning ranges are set in such a manner that two sets of laser scanning data that are obtained at adjacent instrument points, at least partially overlap.

Moreover, matching targets are placed so that multiple matching targets, basically, four or more matching targets, are contained in the overlapping part of the laser scanning ranges of the adjacent instrument points. The matching target includes a reflection prism, a support base for supporting the reflection prism, and a tripod for supporting the support base. The reflection prism is a commercially available reflection prism for surveying and reflects incident light back in a direction different from the incident direction by 180 degrees. The matching targets are the same objects. The matching targets can be distinguished from an object to be measured, from which point cloud data is to be obtained, but cannot be distinguished from each other in laser scanning data in this example.

Figure 2:
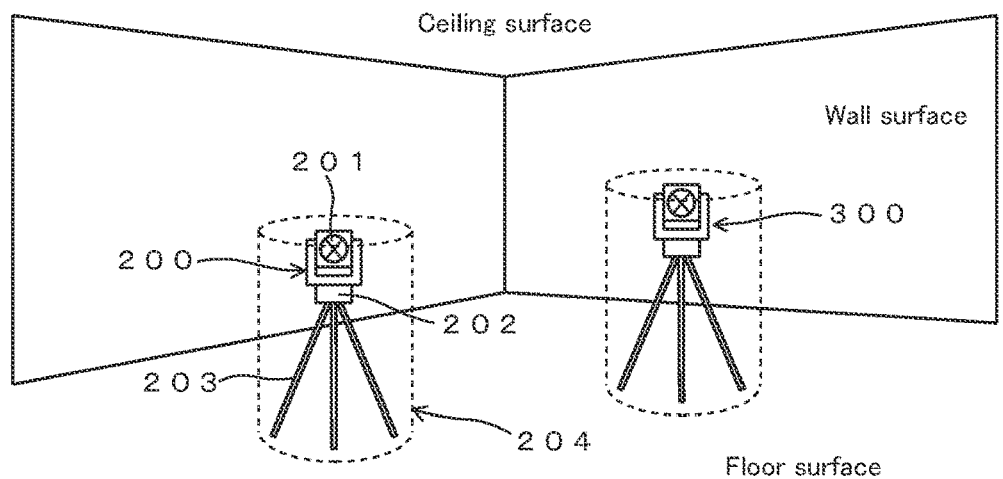
FIG. 2 shows an object to be subjected to laser scanning in the embodiment.

FIG. 2 shows a case of placing matching targets 200 and 300 in a room to be subjected to laser scanning. Although two matching targets are shown in FIG. 2, a greater number of matching targets are placed in actual practice. Normally, matching targets are placed in such a manner that four or more matching targets exist in an overlapping part of sets of point cloud data to be integrated.

The matching target 200 includes a reflection prism 201, a support base 202, and a tripod 203. The reference symbol 204 represents a point cloud data eliminating region, which will be described later. The matching target 300 is the same as the matching target 200, and therefore, descriptions thereof are not repeated.

The laser scanner that is used is a commercially available one. The technique relating to the laser scanner is disclosed in Japanese Unexamined Patent Applications Laid-Open Nos. 2010-151682 and 2008-268004, U.S. Pat. Nos. 8,767,190 and 7,969,558, U.S. Patent Application Publication No. 2017/0269197, etc. A laser scanner that electronically scans, as disclosed in U.S. Patent Application Publication No. 2015/0293224, can also be employed as the laser scanner.

Although a laser scanner is used as an example of a device for obtaining point cloud data, it is also possible to use other types of LiDAR, such as flash LiDAR that obtains point cloud data in a plane manner without performing scanning.

The point cloud data generating unit 102 generates point cloud data on the basis of the laser scanning data received by the laser scanning data receiving unit 101. Herein, point cloud data is obtained by subjecting the laser scanning data to coordinate conversion into a three-dimensional coordinate system. In the point cloud data, coordinates of each point are described in an XYZ coordinate system having an origin at an instrument point of the base laser scanning data. Of course, it is also possible to use data that contains points each described by other coordinate systems, e.g., polar coordinates, as point cloud data.

At this stage, in the condition in which an attitude and a location, or more precisely, a location of an instrument point, in the absolute coordinate system of the laser scanner that is used are known, point cloud data containing locations that are described in the absolute coordinate system, is obtained. For example, point cloud data containing coordinates specified by latitude, longitude, and elevation, is obtained. The absolute coordinate system is a coordinate system for describing a location in a GNSS or on a map.

The target detecting unit 103 detects the matching target from among the laser scanning data. The matching target is a reflection prism for surveying and includes a dedicated mirror plane or mirror, thereby having a reflectance higher than that of an object to be measured. Thus, evaluation and determination of an intensity of measurement light, which is light reflected back from a reflection point, enable determining whether the light is reflected back from the matching target.

The detection of the target is automatically or manually performed. Examples of a method of automatic operation include a method using a preliminarily set threshold and a method using image information. In a case of manual operation, an operator visually checks point cloud data in the form of an image and determines data that is presumed as light reflected back from the target. In addition to the reflection prism, the target may use, e.g., a mirror, any type of reflecting plate, a white circle drawn at the center of black paper or on a black plate, or a black-and-white checkerboard.

For example, in a case in which detected light has an absolute intensity or a relative intensity of a specific value or greater, this detected light is determined as being reflection light that is reflected back from the matching target. Then, location data relating to this reflection light, or more specifically, location data of a reflection point, is acquired, whereby a location of the matching target is measured. This process is performed by the target detecting unit 103.

The correspondence relationship determining unit 104 determines a correspondence relationship between two sets of point cloud data. At this time, information of a matching target in which a correspondence relationship is clear, is used as a constraining condition. The determination of the correspondence relationship is performed by using a publicly known matching technique, such as template matching. The matching between sets of point cloud data can use a technique, as disclosed in, for example, Japanese Unexamined Patent Applications Laid-Open Nos. 2013-186816 and 2013-178656.

In one example, four matching targets are commonly contained in two sets of point cloud data. In this case, a correspondence relationship between the two sets of point cloud data is determined as follows: a relative location relationship between the two sets of point cloud data is adjusted, and a condition in which locations of the four matching targets coincide with each other between the two sets of point cloud data, is searched for. Of course, in this process, point clouds relating to other than the matching targets are also to be subjected to the matching.

The point cloud data integrating unit 105 integrates the two sets of point cloud data in which the correspondence relationship is determined. As a result of the integration of the two sets of point cloud data, the two sets of point cloud data are described in the same coordinate system. The target location acquiring unit 106 acquires locations of the multiple matching targets in an integrated point cloud data that is obtained by integrating the two sets of point cloud data.

The point cloud data eliminating region setting unit 107 sets regions of point cloud data to be eliminated, on the basis of the acquired locations of the matching targets. The following describes an example of this process. Herein, it is assumed that first point cloud data and second point cloud data are integrated in an XYZ coordinate system. The location of the matching target is represented as Pi (i=1, 2, 3, . . . ).

First, point clouds that spread in a plane manner are detected above and under the Pi. This process detects a floor surface or a ground surface, and a ceiling surface. There may be cases in which a ceiling surface is not detected in, e.g., measurement performed outside.

Next, a perpendicular passing the Pi is set. A cylinder having this perpendicular as an axis is then set. The length or height and the diameter of the cylinder are specified so as to contain the matching target, including the tripod. These dimensions are obtained and defined in advance. The space of the cylinder represents an eliminating region from which point cloud data relating to the matching target is to be eliminated.

FIG. 2 shows a point cloud data eliminating region 204 as an example. The point cloud data eliminating region 204 is a cylindrical space containing the matching target 200, which is constituted of the reflection prism 201, the support base 202, and the tripod 203.

In setting the point cloud data eliminating region, the dimension in the height direction of the point cloud data eliminating region, which is a cylindrical region in this example, is adjusted so that the point cloud of the previously detected floor surface or ground surface and the point cloud of the previously detected ceiling surface will not be contained in the point cloud data eliminating region. In some cases, the ceiling surface may not exist. That is, the dimension in the height direction of the point cloud data eliminating region is adjusted in such a manner that point cloud data representing the floor surface or ground surface and the ceiling surface are not contained in the space for the point cloud data eliminating region.

The point cloud data eliminating unit 108 eliminates point clouds in the space or the region, which is set by the point cloud data eliminating region setting unit 107, from among the point cloud data acquired by the point cloud data integrating unit 105. This eliminates point cloud data relating to the matching target. For example, eliminating the point cloud data contained in the point cloud data eliminating region 204 in FIG. 2 results in elimination of the point cloud data relating to the matching target 200, from among the integrated point cloud data.

Example of Processing

Figure 3:
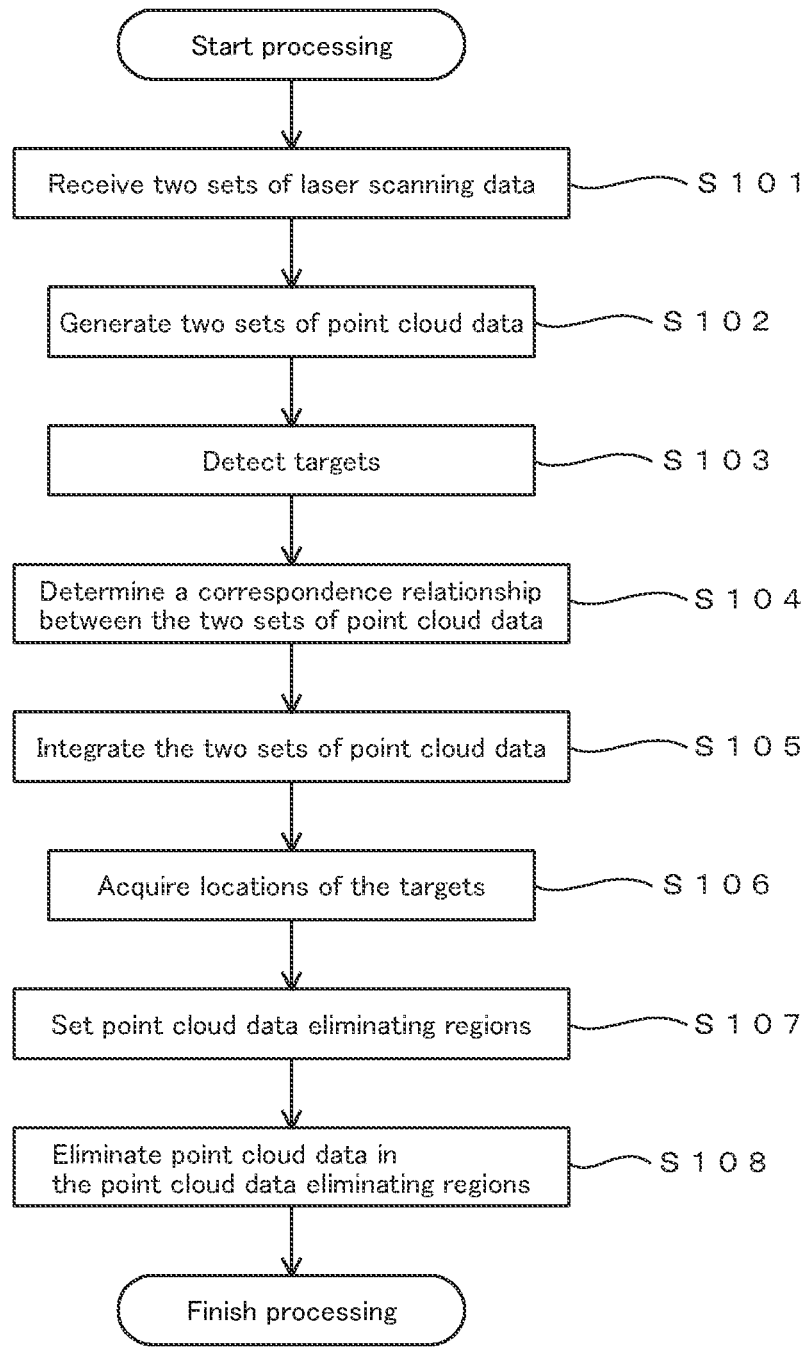
FIG. 3 is a flowchart showing an example of a processing procedure.

FIG. 3 is a flowchart showing an example of processing performed by the laser scanning data processing device 100. The program for executing the processing in FIG. 3 is stored in the storage of the laser scanning data processing device 100 or in an appropriate storage medium, is read therefrom, and is executed by the CPU of the PC constituting the laser scanning data processing device 100. It is also possible to store this program in a server and download it therefrom via the internet.

Herein, an example of a case of integrating two sets of point cloud data that are obtained by laser scanning will be described. Prior to the processing in FIG. 3, laser scanning at a first instrument point is performed to obtain first laser scanning data, and moreover, laser scanning at a second instrument point is performed to obtain second laser scanning data. It is assumed that the two sets of point cloud data partially overlap and that four or more matching targets are disposed in the overlapping part.

After the processing starts, first, the first laser scanning data and the second laser scanning data are acquired (step S101). This process is performed by the laser scanning data receiving unit 101.

Next, first point cloud data is generated on the basis of the first laser scanning data, and second point cloud data is generated on the basis of the second laser scanning data (step S102). This process is performed by the point cloud data generating unit 102. Then, matching targets are detected from among the first and the second point cloud data (step S103). This process is performed by the target detecting unit 103.

Thereafter, a correspondence relationship between the first and the second point cloud data is determined by using the matching targets detected in step S103 (step S104). This process is performed by the correspondence relationship determining unit 104.

Next, the two sets of the point cloud data, in which the correspondence relationship is determined in step S104, are integrated to obtain integrated point cloud data (step S105). This process is performed by the point cloud data integrating unit 105.

Then, locations of the matching targets, which are detected in step S103, are acquired from among the point cloud data obtained in step S105, that is, the integrated point cloud data in which the first and the second point cloud data are integrated (step S106). This process is performed by the target location acquiring unit 106.

Thereafter, on the basis of the locations of the matching targets acquired in step S106, point cloud data eliminating regions from which the point cloud data are to be eliminated, are set (step S107). This process is performed by the point cloud data eliminating region setting unit 107.

Then, the point cloud data that are contained in the point cloud data eliminating regions set in step S107, are eliminated from among the integrated point cloud data obtained in step S105 (step S108). As a result, point cloud data relating to the matching targets and the relating members are eliminated from the integrated point cloud data.

2. Second Embodiment

Processing in a case of using three or more sets of point cloud data will be described. In this case, first point cloud data and second point cloud data are integrated to obtain first integrated point cloud data. The processes at this stage are the same as those in steps S101 to S105.

Next, in the condition in which point cloud data relating to the matching targets is not eliminated but is made to remain, the first integrated point cloud data and third point cloud data are integrated. The processes at this stage are also the same as those in steps S101 to S105.

Subsequently, integration of each of sets of point cloud data is successively performed. At the final stage, the processes in step S106 and in the subsequent steps in FIG.

3 are performed, whereby point cloud data relating to the matching targets is eliminated from integrated point cloud data finally obtained.

3. Third Embodiment

It is possible to distinguish matching targets from each other by laser scanning. Examples of a method for distinguishing matching targets from each other by laser scanning include a method using differences in reflection characteristics between the reflection prisms and a method using a coded target that is prepared separately from the reflection prism. Alternatively, a target having multiple reflection prisms that are arranged thereon may be prepared, and the matching targets may be distinguished from each other by differences in number, position, and interval of the arranged reflection prisms.

It is also possible to detect a matching target in an image. In this case, a combination of a reflection prism and a coded target is used as a matching target. The coded target is a target showing an image of two-dimensional code information. This technique is disclosed in, for example, Japanese Unexamined Patent Applications Laid-Open Nos. 2011-053031 and 2011-053030.

This case uses a laser scanner equipped with a camera. The laser scanner having the camera is configured to photograph an area that has been subjected to laser scanning, by using the camera, and to obtain a point cloud image showing point clouds in a photographic image by points.

In the laser scanner having the camera, relationships of exterior orientation parameters between the laser scanner and the camera are already known, and a point cloud image containing point cloud data overlying an image is obtained. Identification information of the coded targets are detected in the image information of this point cloud image, and the matching targets are individually identified.

In the condition in which the matching targets are individually identified, constraining conditions are stricter in obtaining a correspondence relationship between two sets of point cloud data, whereby the correspondence relationship is more easily determined.

4. Fourth Embodiment

The cross sectional shape of the tubular space from which point cloud data is to be eliminated is not limited to being circular, and it may be an ellipse or a polygon, such as a quadrangle or a pentagon.

5. Fifth Embodiment

Elimination of point cloud data of a ceiling part and a floor part can be avoided by the following method. In one example, only a radius of a cylindrical part is specified, and point cloud data between a ceiling part and a floor part, corresponding to the cylindrical part, is eliminated.

In another example, a cylindrical space is specified, and among point clouds contained in this cylindrical space, point clouds that are determined as being of a floor surface and a ceiling surface are excluded from targets to be eliminated. In this case, point cloud data that spreads in a plane manner and in an area of a specific size or wider is determined as point cloud data of a floor surface or of a ceiling surface, and this point cloud data is excluded from the targets to be eliminated. This avoids undesirable elimination by which point cloud data of a floor surface and a ceiling surface are eliminated as point cloud data of matching targets.

6. Other Matters

The present invention is not limited to use for point cloud data that is obtained by a ground installed laser scanner, and the present invention can also be used in point cloud data that is acquired by the following techniques. (1) Eliminate a matching target in a laser scanning point cloud that is obtained while a mobile body, e.g., a vehicle, which is mounted with a laser scanner, travels. (2) Eliminate a matching target in a laser scanning point cloud that is obtained by an unmanned aerial vehicle (UAV) mounted with a laser scanner, while the UAV is flying.

To describe finally obtained point cloud data in the absolute coordinate system, a target for orientation in which a location in the absolute coordinate system is determined, may be used in some cases. In this case, the target for orientation also serves as a matching target. The present invention can also be used for eliminating this target for orientation.

Moreover, the present invention can also be used for point cloud data that is obtained based on a principle of stereoscopic photogrammetry. For example, the present invention can be used in order to eliminate an orientation target in point cloud data that is obtained by photogrammetry, such as aerial photogrammetry.

What is claimed is:

1. A surveying data processing device configured to process first point cloud data and second point cloud data,
   the first point cloud data and the second point cloud data being obtained by laser scanning from different viewpoints and partially overlapping with each other,
   the first point cloud data and the second point cloud data containing both point cloud data of a measurement object and point cloud data of a matching target,
   the first point cloud data and the second point cloud data containing the same point cloud data of the matching target,
   the surveying data processing device comprising a processor or circuitry, the processor or circuitry configured to:
   determine a correspondence relationship between the first point cloud data and the second point cloud data by using the point cloud data of the matching target;
   integrate the first point cloud data and the second point cloud data after the correspondence relationship therebetween is determined, to obtain integrated point cloud data;
   detect, among the integrated point cloud data, light in which an intensity of light is a predetermined value or greater, as reflection light that is reflected back from the matching target;
   acquire a location of the matching target after the reflection light of the matching target is detected;
   set a tubular space containing the matching target, on a basis of the location of the matching target, the tubular space passing the location of the matching target and having a perpendicular of a plane above or under the location of the matching target as an axis; and
   eliminate point cloud data that is contained in the tubular space.

2. The surveying data processing device according to claim 1, wherein the matching target includes a reflection prism and a leg part that supports the reflection prism, and the tubular space is set so as to have dimensions for containing the reflection prism and the leg part.

3. The surveying data processing device according to claim 1, wherein the tubular space is set in such a manner as not to contain point cloud data of a plane crossing a vertical axis that passes the location of the matching target.

4. A surveying data processing method for processing first point cloud data and second point cloud data,
the first point cloud data and the second point cloud data being obtained by laser scanning from different viewpoints and partially overlapping with each other,
the first point cloud data and the second point cloud data containing both point cloud data of a measurement object and point cloud data of a matching target,
the first point cloud data and the second point cloud data containing the same point cloud data of the matching target,
the method comprising:
determining a correspondence relationship between the first point cloud data and the second point cloud data by using the point cloud data of the matching target;
integrating the first point cloud data and the second point cloud data after the correspondence relationship therebetween is determined, to obtain integrated point cloud data;
detecting, among the integrated point cloud data, light in which an intensity of light is a predetermined value or greater, as reflection light that is reflected back from the matching target;
acquiring a location of the matching target after the reflection light of the matching target is detected;
setting a tubular space containing the matching target, on a basis of the location of the matching target, the tubular space passing the location of the matching target and having a perpendicular of a plane above or under the location of the matching target as an axis; and
eliminating point cloud data that is contained in the tubular space.

5. A non-transitory computer recording medium storing computer executable instructions for processing first point cloud data and second point cloud data,
the first point cloud data and the second point cloud data being obtained by laser scanning from different viewpoints and partially overlapping with each other,
the first point cloud data and the second point cloud data containing both point cloud data of a measurement object and point cloud data of a matching target,
the first point cloud data and the second point cloud data containing the same point cloud data of the matching target,
the computer executable instructions that, when executed by a computer processor, cause the computer processor to:
determine a correspondence relationship between the first point cloud data and the second point cloud data by using the point cloud data of the matching target;
integrate the first point cloud data and the second point cloud data after the correspondence relationship therebetween is determined, to obtain integrated point cloud data;
detect, among the integrated point cloud data, light in which an intensity of light is a predetermined value or greater, as reflection light that is reflected back from the matching target;
acquire a location of the matching target after the reflection light of the matching target is detected;
set a tubular space containing the matching target, on a basis of the location of the matching target, the tubular space passing the location of the matching target and having a perpendicular of a plane above or under the location of the matching target as an axis; and
eliminate point cloud data that is contained in the tubular space.

6. A surveying data processing device configured to process point cloud data that is obtained by laser scanning, the point cloud data containing both point cloud data of a measurement object and point cloud data of a reflection prism,
the surveying data processing device comprising a processor or circuitry, the processor or circuitry configured to:
detect, among the point cloud data that is obtained by laser scanning, light in which an intensity of light is a predetermined value or greater, as reflection light that is reflected back from the reflection prism;
acquire a location of the reflection prism after the reflection light of the reflection prism is detected;
set a tubular space containing the reflection prism, on a basis of the location of the reflection prism, the tubular space passing the location of the reflection prism and having a perpendicular of a plane above or under the location of the reflection prism as an axis; and
eliminate point cloud data that is contained in the tubular space.

* * * * *

UNITED STATES PATENT AND TRADEMARK OFFICE
CERTIFICATE OF CORRECTION

| | |
|---|---|
| PATENT NO. | : 11,619,741 B2 |
| APPLICATION NO. | : 16/994698 |
| DATED | : April 4, 2023 |
| INVENTOR(S) | : You Sasaki |

It is certified that error appears in the above-identified patent and that said Letters Patent is hereby corrected as shown below:

On the Title Page

At Item (73) Assignee, the address information for Topcon Corporation "Tokyo (JP)" should read --Itabashi-ku, Tokyo (JP)--

Signed and Sealed this
Sixth Day of June, 2023

Katherine Kelly Vidal
*Director of the United States Patent and Trademark Office*